US009840113B2

(12) United States Patent
Kim

(10) Patent No.: US 9,840,113 B2
(45) Date of Patent: Dec. 12, 2017

(54) NON-PNEUMATIC TIRE HAVING IMPROVED RIDING COMFORT

(71) Applicant: HANKOOK TIRE CO., LTD., Seoul (KR)

(72) Inventor: Yong Hun Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 0 days.

(21) Appl. No.: 14/809,923

(22) Filed: Jul. 27, 2015

(65) Prior Publication Data
US 2016/0046154 A1 Feb. 18, 2016

(30) Foreign Application Priority Data

Aug. 13, 2014 (KR) .................. 10-2014-0105166

(51) Int. Cl.
| | | |
|---|---|---|
| *B60C 7/14* | (2006.01) | |
| *B60C 7/18* | (2006.01) | |
| *B60B 9/26* | (2006.01) | |

(52) U.S. Cl.
CPC .................. *B60C 7/14* (2013.01); *B60C 7/18* (2013.01); *B60B 9/26* (2013.01); *B60C 2007/146* (2013.01)

(58) Field of Classification Search
CPC .. B60C 7/14; B60C 7/18; B60B 21/02; B60B 21/26; B60B 2007/146; B60B 21/12; B60B 21/026
USPC .. 152/69, 70, 71, 72, 73, 74, 246, 247, 258, 152/259; 301/6.91
See application file for complete search history.

(56) References Cited

U.S. PATENT DOCUMENTS

| | | | | |
|---|---|---|---|---|
| 3,960,400 | A * | 6/1976 | Licht | ................... B60B 17/0041 295/11 |
| 8,609,220 | B2 * | 12/2013 | Summers | .................. C22C 1/08 152/246 |
| 8,714,217 | B2 * | 5/2014 | Chon | ........................ B60B 9/02 152/17 |
| 2003/0141642 | A1 * | 7/2003 | Uchida | ..................... B60B 9/12 267/240 |
| 2009/0026830 | A1 * | 1/2009 | Shiraishi | ................... B60B 9/12 301/11.3 |

(Continued)

FOREIGN PATENT DOCUMENTS

| | | |
|---|---|---|
| JP | 2012245837 | 12/2012 |
| KR | 20090049982 | 5/2009 |

OTHER PUBLICATIONS

Korean Office Action issued in the corresponding Korean patent application 10-2014-0105166, dated Jun. 3, 2015.

*Primary Examiner* — S. Joseph Morano
*Assistant Examiner* — Jean Charleston
(74) *Attorney, Agent, or Firm* — Hamre, Schumann, Mueller & Larson, P.C.

(57) ABSTRACT

A non-pneumatic tire is disclosed herein. The non-pneumatic tire includes a cylindrical tread configured to come into contact with a road surface, an aluminum wheel configured to form a circumference smaller than that of the tread and concentrically disposed inside the tread, and a polyurethane spoke configured to perform a shock absorbing action while connecting the tread with the aluminum wheel. The aluminum wheel includes a plurality of depressed grooves formed at predetermined intervals along the circumferential surface of the aluminum wheel. A plurality of vibration isolators made of vibration isolation material is inserted into the grooves.

13 Claims, 5 Drawing Sheets

(56) References Cited

U.S. PATENT DOCUMENTS

| | | | | |
|---|---|---|---|---|
| 2012/0038206 A1* | 2/2012 | Chadwick | ............... | B60O 7/18 |
| | | | | 301/37.23 |
| 2012/0241531 A1* | 9/2012 | Werner | ............... | B60C 11/0311 |
| | | | | 239/1 |
| 2014/0084670 A1* | 3/2014 | Sanchez, Sr. | ........... | B60B 11/10 |
| | | | | 301/11.1 |

* cited by examiner

NON-PNEUMATIC TIRE HAVING IMPROVED RIDING COMFORT

BACKGROUND

1. Technical Field

The present invention relates generally to a non-pneumatic tire and, more particularly, to a non-pneumatic tire that includes vibration isolators between a polyurethane spoke and an aluminum wheel, thereby achieving an excellent vibration isolation effect and also improving the performance of adhesion between the spoke and the wheel.

2. Description of the Related Art

Non-pneumatic tires are designed such that a spoke is responsible for the function of air pressure, unlike pneumatic tires. Non-pneumatic tires have advantages in that the risk of the puncture, which is a major issue for pneumatic tires, is eliminated and also it is not necessary to maintain air pressure. In general, conventional non-pneumatic tires include spoke members arranged between inner and outer cylindrical members at predetermined intervals and within a predetermined angle range, and thus empty spaces are present among the spoke members, with the result that serious vibrations are generated during the running of a vehicle.

Recently, a non-pneumatic tire having a structure in which a spoke made of polyurethane directly comes into contact with an aluminum wheel has been developed. Although the tire primarily isolates impacts, occurring on the surface of the tire that comes into contact with a road surface, by means of a rubber tread, the tire has a disadvantage in that the tire is detrimental to riding comfort because impact force or pressure, generated when the tire comes into contact with a road surface during the rotation of the tire, is transferred from the polyurethane spoke to the wheel.

SUMMARY

At least one embodiment of the present invention is directed to the provision of a non-pneumatic that is capable of reducing the vibration transmissibility between a polyurethane spoke and an aluminum wheel, thereby improving the riding comfort of the tire.

In accordance with an aspect of the present invention, there is provided a non-pneumatic tire, including a cylindrical tread configured to come into contact with a road surface, an aluminum wheel configured to form a circumference smaller than that of the tread and concentrically disposed inside the tread, and a polyurethane spoke configured to perform a shock absorbing action while connecting the tread with the aluminum wheel; wherein the aluminum wheel includes a plurality of depressed grooves formed at predetermined intervals along the circumferential surface of the aluminum wheel, and a plurality of vibration isolators made of vibration isolation material is inserted into the grooves.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. However, it should be noted that the accompanying drawings merely show embodiments illustrated to describe the technical spirit of the present invention in detail and, thus, the technical spirit of the present invention is not limited to the specific shapes illustrated in the accompanying drawings.

Figure 1:
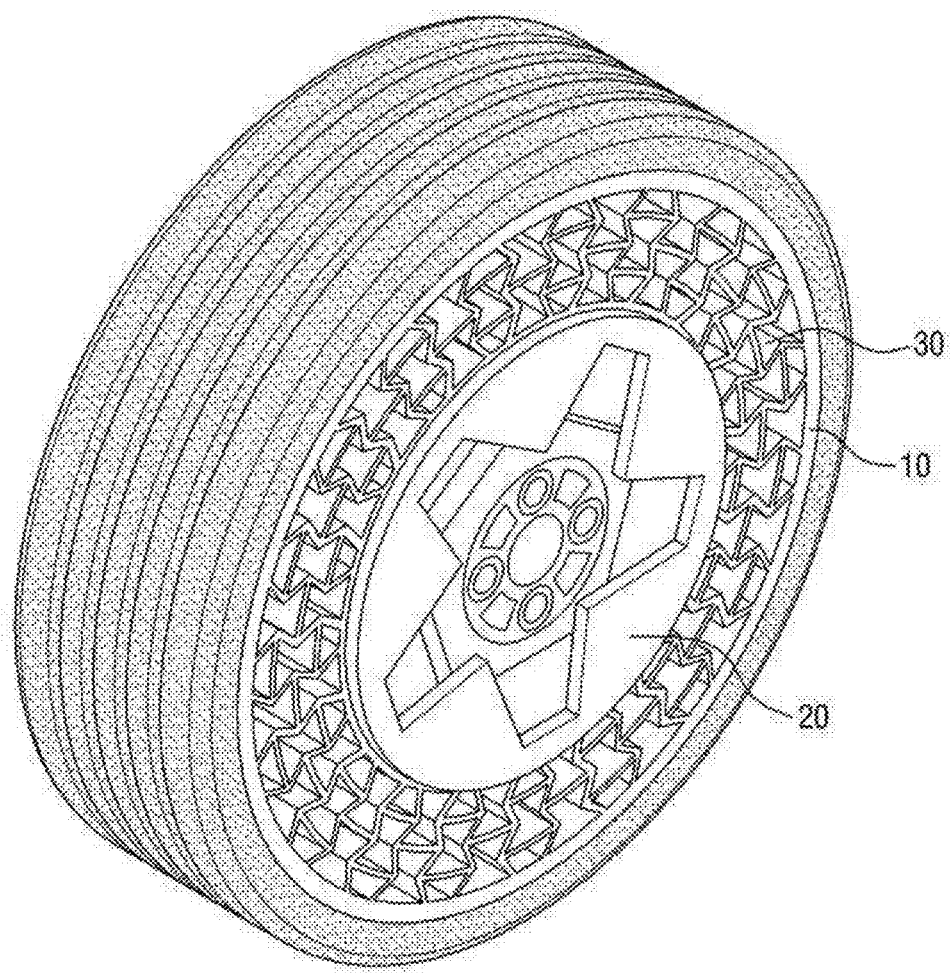
FIG. 1 is a perspective view of a non-pneumatic tire according to an embodiment of the present invention.

FIG. 1 is a perspective view of a non-pneumatic tire according to an embodiment of the present invention. Referring to FIG. 1, the non-pneumatic tire according to the present embodiment includes a tread 10 configured to come into contact with a road surface and have a predetermined pattern shape, and an aluminum wheel 20 configured to have a circumference smaller than that of the tread 10 and concentrically disposed inside the tread 10. Furthermore, the non-pneumatic tire further includes a spoke 30 configured to providing a shock absorbing action while connecting the tread 10 and the aluminum wheel 20. The spoke 30 functions as a shock absorbing part, and is made of polyurethane.

The present invention is intended to improve the riding comfort of a tire by inserting rubber vibration isolators having a vibration isolation effect between the polyurethane spoke 30 and the aluminum wheel 20. In a broad sense, the term "isolation of vibrations" used herein refers to all types of techniques for insulating, blocking or isolating a vibration path along which vibrations are transferred from a vibration source to an adjacent mechanical element. More specifically, the term "isolation of vibrations" used herein refers to preventing vibrations, generated by impacts or pressures occurring on the surface of a tire that comes into contact with a road surface, from being transferred to the aluminum wheel 20.

Figure 2A:
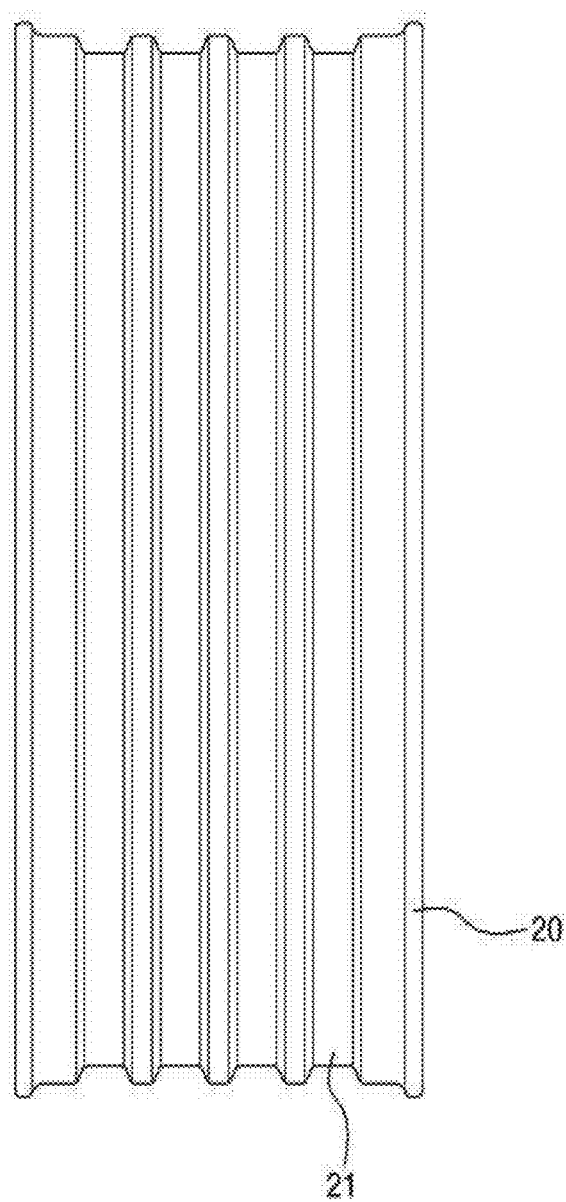
FIG. 2A is a front view showing a structure in which grooves are formed on an aluminum wheel according to an embodiment of the present invention.
Figure 2B:
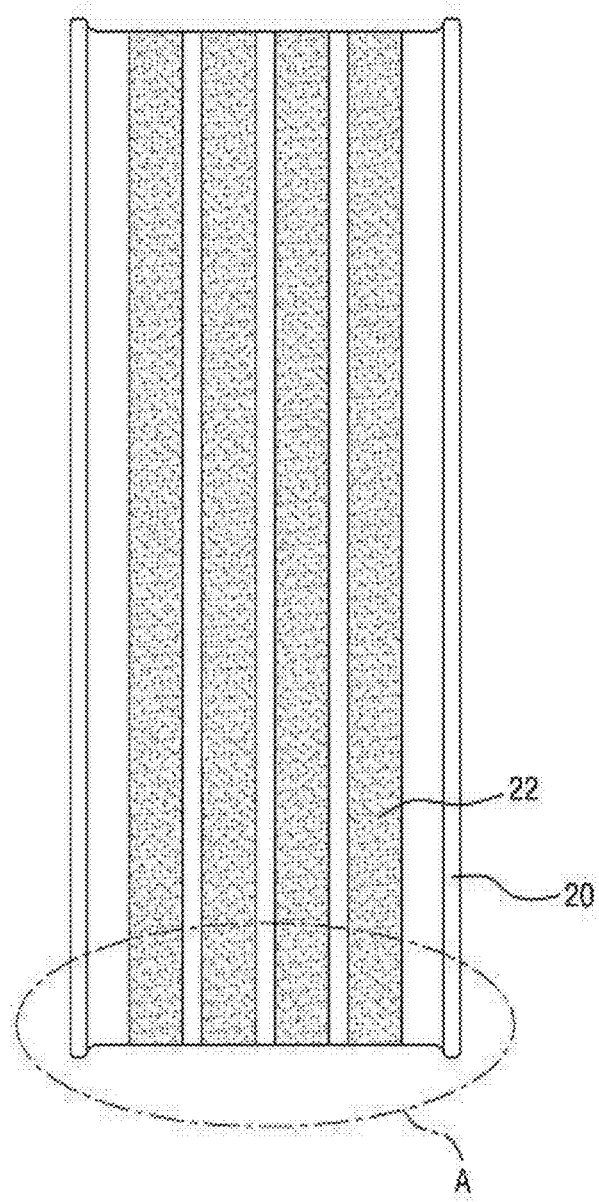
FIG. 2B is a front view showing a structure in which vibration isolators are inserted into the grooves of an aluminum wheel according to an embodiment of the present invention.

FIG. 2A is a front view showing a structure in which grooves are formed on an aluminum wheel according to an embodiment of the present invention. Referring to FIG. 2A, an aluminum wheel 20 includes a plurality of grooves 21 that are formed on the circumferential surface of the aluminum wheel 20 at predetermined intervals. FIG. 2B is a front view showing a structure in which vibration isolators are inserted into the grooves of an aluminum wheel according to an embodiment of the present invention. Referring to FIG. 2B, vibration isolators 22 made of vibration isolation material are inserted into grooves 21. These vibration isolators 22 can effectively isolate vibrations generated by impacts or pressures occurring on the surface of a tire that comes into contact with a road surface.

The present invention is designed such that the aluminum wheel 20 is fabricated in a structure in which the grooves 21 are formed on the circumferential surface of the aluminum wheel 20 and the grooves 21 are filled with the vibration isolators 22, as described above, thereby preventing the performance of the coupling of the aluminum wheel 20 and the spoke 30 from being reduced. That is, in general, to couple the aluminum wheel 20 and the spoke 30, an adhesive is applied onto the circumferential surface of the aluminum wheel 20, and then the aluminum wheel 20 is coupled with the spoke 30. According to the present invention, depressed stepped grooves 21 are formed on the aluminum wheel 20 and the vibration isolators 22 are inserted into the grooves 21, and thus the sliding friction between the aluminum wheel 20 and the spoke 30 can be reduced, thereby improving the performance of adhesion between the aluminum wheel 20 and the spoke 30.

Meanwhile, although the grooves 21 are illustrated as being designed to extend along the longitudinal direction of a tire, i.e., the circumferential direction of the tire in FIG. 2A, grooves 21 may be also formed along a tire width direction, that is the direction perpendicular to the circumferential direction of the tire and vibration isolators 22 may be inserted into the grooves 21 in another embodiment of the present invention.

Figure 3:
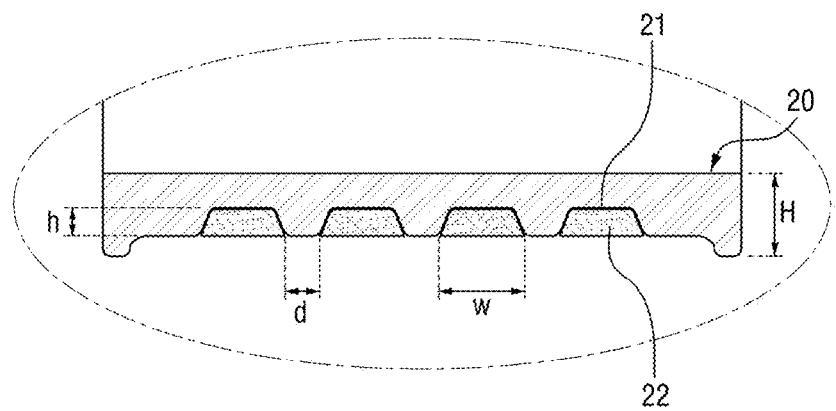
FIG. 3 is an enlarged view of portion A of FIG. 2B.

FIG. 3 is an enlarged view of portion A of FIG. 2B. Referring to FIG. 3, in the embodiments of the present invention, the width w of one groove 21 preferably ranges from 10 to 15% of the overall width of the aluminum wheel 20. The vibration isolation effect decreases when the width w is less than 10% of the overall width of the aluminum wheel 20, and the performance of adhesion between the aluminum wheel 20 and the spoke 30 degrades when the width w exceeds 15% of the overall width of the aluminum wheel 20.

The interval d between the neighboring grooves 21 preferably ranges from 30 to 50% of the width w of the groove 21. When the interval d is less than 30% of the width w, an area into which the vibration isolator 22 is inserted increases, and thus the performance of adhesion between the wheel 20 and the spoke 30 may degrade. In contrast, when the interval d exceeds 50% of the width w, an area in which the vibration isolator 22 is inserted decreases, and thus the vibration isolation effect decreases.

The thickness h of the grooves 21 preferably ranges from 20 to 50% of the overall thickness H of the widthwise part of the aluminum wheel 20. The vibration isolation effect is not sufficient when the thickness h is less than 20% of the overall thickness H of the widthwise part of the aluminum wheel 20, and the strength of the aluminum wheel 20 may decrease and also the weight of the tire may increase when the thickness h exceeds 50% of the overall thickness H of the widthwise part of the aluminum wheel 20.

To achieve a vibration isolation effect intended by the present invention, the material of the vibration isolators 22 is preferably a material having a soft modulus of elasticity equal to or less than 20% of the modulus of elasticity of polyurethane, i.e., the material of the spoke 30.

A transmissibility (TR) reduction equation that can be theoretically applied when vibration insulating material is used may be expressed by Equation 1:

$$TR = \frac{\left(\frac{1}{K_{body}} + \frac{1}{K_{source}}\right)}{\left(\frac{1}{K_{body}} + \frac{1}{K_{iso}} + \frac{1}{K_{source}}\right)} \quad (1)$$

In Equation 1, $K_{source}$ is the modulus of elasticity of the polyurethane spoke, and has a value of about 32 Mpa.

$K_{body}$ is the modulus of elasticity of the aluminum wheel, and has a value of about 76000 Mpa.

$K_{iso}$ is the modulus of elasticity of insulating rubber used as the vibration isolators, and has a value of about 6 Mpa.

The vibration transmissibility based on the values of $K_{source}/K_{iso}$ and $K_{body}/K_{iso}$ according to Equation 1 is listed in Table 1:

TABLE 1

| | | $K_{source}/K_{iso}$ | | |
|---|---|---|---|---|
| | | 1 | 5 | infinite |
| $K_{body}/K_{iso}$ | 1 | 0.67 | 0.54 | 0.5 |
| | 5 | 0.54 | 0.28 | 0.17 |
| | infinite | (0.5)⇒ | (0.17) | 0 |

According to Table 1, as the ratio of the modulus of elasticity $K_{source}$ of the polyurethane to the modulus of elasticity $K_{iso}$ of the vibration isolators 22 decreases, the vibration isolation effect increases. According to the embodiments of the present invention, the modulus of elasticity of the vibration isolators 22 preferably ranges from 1 to 20% of the modulus of elasticity of the polyurethane. When the modulus of elasticity exceeds 20%, the vibration isolation effect that can be achieved by the vibration isolators 22 significantly decreases.

When the vibration isolation effect is calculated according to Equation 1 in the case where the vibration isolators 22 have been applied to the overall circumferential surface of the aluminum wheel 20, a vibration transmissibility reduction effect of about 66% is theoretically achieved. However, when the vibration isolators 22 are applied to the overall circumferential surface of the aluminum wheel 20, there is a possibility that the sliding friction between the aluminum wheel 20 and the spoke 30 increases after fabrication and thus the performance of adhesion is degraded. Accordingly, the inventors of the present invention have designed the insertion of the vibration isolators 22 so that the overall surface area of the vibration isolators 22 becomes a maximum of 50% of the overall surface area of the aluminum wheel 20 in preparation for a phenomenon of a separation between the aluminum wheel 20 and the spoke 30 that may occur after fabrication.

When the vibration isolation effect is calculated in the case where the vibration isolators 22 are applied such that the overall surface area of the vibration isolators 22 corresponds to 50% of the overall surface area of the aluminum wheel 20, a transmissibility reduction effect of about 33% is achieved. When the vibration isolators 22 are applied such that the overall surface area of the vibration isolators 22 corresponds to 50% or less of the circumferential surface of the aluminum wheel 22, advantages arise in that a vibration isolation effect can be not only achieved but the performance of adhesion between the polyurethane spoke 30 and the aluminum wheel 20 can be also improved. Within the range of 50%, as the ratio of the surface of the inserted vibration isolators 22 to the circumferential surface of the aluminum wheel 20 increases, the vibration isolation effect increases.

The material of the vibration isolators 22 that can be used in the embodiments of the present invention may be any soft material as long as the material has a modulus of elasticity equal to or less than 20% of the modulus of elasticity of polyurethane. A representative vibration insulating material is vibration-proof rubber. More specifically, the material of the vibration isolators may be one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

The present invention is described in greater detail using test examples. These test examples are used merely to describe the specific examples of the present invention, and the range of protection of the present invention is not limited to these examples.

Figure 4:
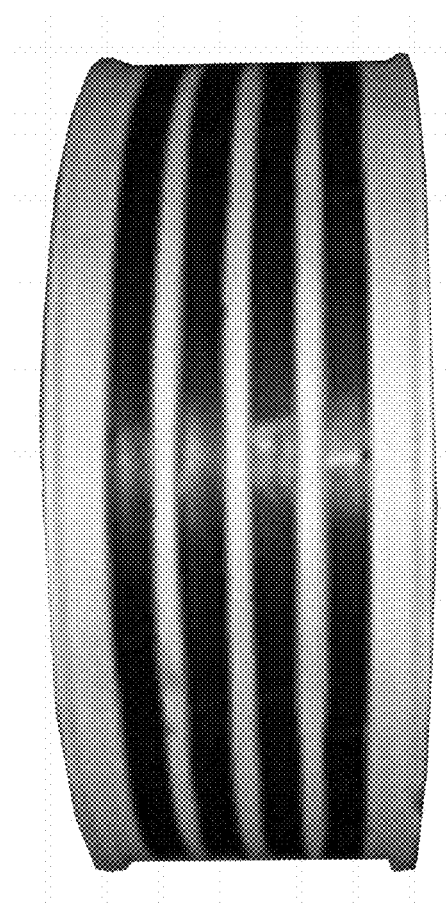
FIG. 4 is a front photo showing an aluminum wheel fabricated according to test example 1 of the present invention.

Test Example 1: Measurement of Vibration Isolation Performance of Non-Pneumatic Tire in which Vibration Isolation Rubber has been Inserted into Aluminum Wheel An aluminum wheel 20, such as that shown in FIG. 4, was fabricated by using butyl rubber, used in the inner liner of a tire, as vibration isolators 22. In this case, the width w of the groove 21 was 16 mm, the interval d between grooves 21 was 7.5 mm, and the thickness of the groove 21 was 6 mm. Input force was applied to a non-pneumatic tire equipped with the aluminum wheel 20 fabricated as described above by applying vibration to the non-pneumatic tire using an impact hammer, and reaction force was measured at the center of the aluminum wheel 20. The reaction force was measured with a 6-component load cell sensor mounted on the axial center of the aluminum wheel 20. Vibration isolation performance was measured by calculating the ratio of the input force to the reaction force, and the results of the measurement were plotted on the graph of FIG. 5.

Comparative Test Example 1: Measurement of Vibration Isolation Performance of Non-Pneumatic Tire Input force was applied by applying vibration to the outside of a common non-pneumatic tire using an impact hammer, and reaction force was measured at the center of an aluminum wheel. Vibration isolation performance was measured by calculating the ratio of the input force to the reaction force, and the results of the measurement were plotted on the graph of FIG. 5.

Figure 5:
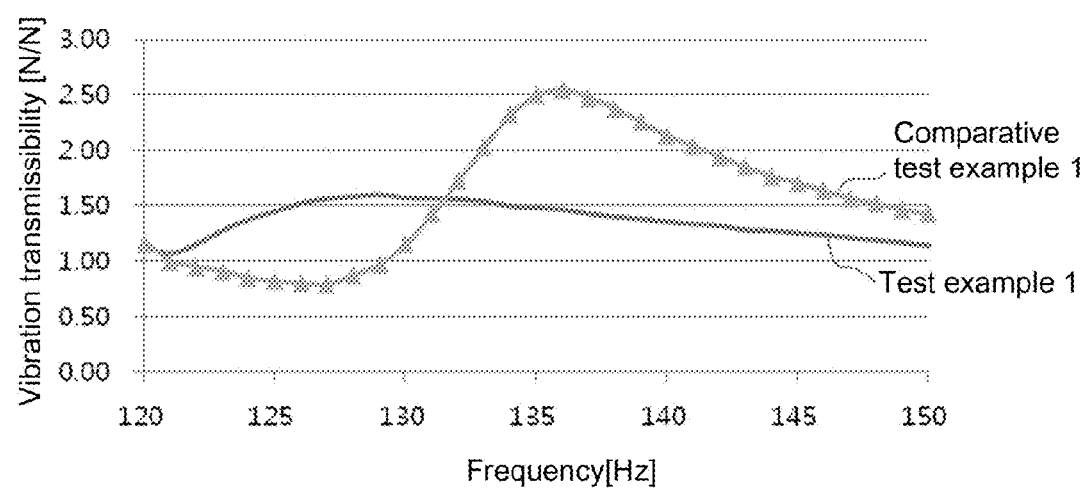
FIG. 5 is a graph plotting the results of measurement of vibration isolation performance based on test example 1 and comparative test example 1.

Referring to the graph of FIG. 5, when the vibration transmissibility of test example 1 is compared with the vibration transmissibility of comparative test example 1, it can be seen that the maximum value thereof was decreased from 2.5 to 1.6 by about 36%.

A non-pneumatic tire according to at least one embodiment of the present invention includes vibration isolators in a plurality of grooves formed on an aluminum wheel, and thus the tire has an excellent vibration isolation effect that can effectively isolate vibrations generated by pressures or impacts occurring on the surface of a tire that comes into contact with a road surface, thereby improving riding comfort, and thus the performance of adhesion between a spoke and the wheel is excellent.

While the specific embodiments of the present invention have been described in detail above, the present invention is not limited to the above-described embodiments, and it will be apparent to those skilled in the art that the configuration of the present invention may be modified and altered in various manners without departing from the scope and range of the present invention. Therefore, the true range of protection of the present invention should be defined based on the attached claims and a range equivalent to the claims.

What is claimed is:

1. A non-pneumatic tire, comprising:
    a cylindrical tread configured to come into contact with a road surface;
    an aluminum wheel configured to form a circumference smaller than that of the tread and concentrically disposed inside the tread; and
    a polyurethane spoke configured to perform a shock absorbing action while connecting the tread with the aluminum wheel,
    wherein the aluminum wheel includes a plurality of depressed grooves formed at predetermined intervals along an outer circumferential surface of the aluminum wheel,
    a plurality of vibration isolators made of vibration isolation material is inserted into the grooves, so that the vibration isolators are inserted onto the outer circumferential surface of the aluminum wheel along a circumferential direction of the tire, and
    a width w of one of the grooves ranges from 10 to 15% of an overall width of the aluminum wheel,
    wherein the depressed grooves are depressed stepped grooves, and the polyurethane spoke directly comes into contact with the vibration isolators for reducing a sliding friction between the aluminum wheel and the polyurethane spoke and improving adhesion between the aluminum wheel and the polyurethane spoke.

2. The non-pneumatic tire of claim 1, wherein the vibration isolators are made of one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

3. A non-pneumatic tire, comprising:
    a cylindrical tread configured to come into contact with a road surface;
    an aluminum wheel configured to form a circumference smaller than that of the tread and concentrically disposed inside the tread; and
    a polyurethane spoke configured to perform a shock absorbing action while connecting the tread with the aluminum wheel,
    wherein the aluminum wheel includes a plurality of depressed grooves formed at predetermined intervals along an outer circumferential surface of the aluminum wheel,
    a plurality of vibration isolators made of vibration isolation material is inserted into the grooves, so that the vibration isolators are inserted onto the outer circumferential surface of the aluminum wheel along a circumferential direction of the tire, and
    an interval d between the neighboring grooves ranges from 30 to 50% of a width w of one of the grooves,
    wherein the depressed grooves are depressed stepped grooves, and the polyurethane spoke directly comes into contact with the vibration isolators for reducing a sliding friction between the aluminum wheel and the polyurethane spoke and improving adhesion between the aluminum wheel and the polyurethane spoke.

4. The non-pneumatic tire of claim 3, wherein the vibration isolators are made of one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

5. A non-pneumatic tire, comprising:
a cylindrical tread configured to come into contact with a road surface;
an aluminum wheel configured to form a circumference smaller than that of the tread and concentrically disposed inside the tread; and
a polyurethane spoke configured to perform a shock absorbing action while connecting the tread with the aluminum wheel,
wherein the aluminum wheel includes a plurality of depressed grooves formed at predetermined intervals along an outer circumferential surface of the aluminum wheel,
a plurality of vibration isolators made of vibration isolation material is inserted into the grooves, and
a thickness h of the grooves ranges from 20 to 50% of an overall thickness H of a widthwise part of the aluminum wheel,
wherein the depressed grooves are depressed stepped grooves, and the polyurethane spoke directly comes into contact with the vibration isolators for reducing a sliding friction between the aluminum wheel and the polyurethane spoke and improving adhesion between the aluminum wheel and the polyurethane spoke.

6. The non-pneumatic tire of claim 5, wherein the vibration isolators are made of one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

7. The non-pneumatic tire according to claim 5, wherein the vibration isolators are inserted onto the outer circumferential surface of the aluminum wheel along a tire width direction.

8. A non-pneumatic tire, comprising:
a cylindrical tread configured to come into contact with a road surface;
an aluminum wheel configured to form a circumference smaller than that of the tread and concentrically disposed inside the tread; and
a polyurethane spoke configured to perform a shock absorbing action while connecting the tread with the aluminum wheel,
wherein the aluminum wheel includes a plurality of depressed grooves formed at predetermined intervals along an outer circumferential surface of the aluminum wheel,
a plurality of vibration isolators made of vibration isolation material is inserted into the grooves, and
a modulus of elasticity of the vibration isolators is equal to or less than 20% of a modulus of elasticity of polyurethane,
wherein the depressed grooves are depressed stepped grooves, and the polyurethane spoke directly comes into contact with the vibration isolators for reducing a sliding friction between the aluminum wheel and the polyurethane spoke and improving adhesion between the aluminum wheel and the polyurethane spoke.

9. The non-pneumatic tire of claim 8, wherein the vibration isolators are made of one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

10. The non-pneumatic tire according to claim 8, wherein the vibration isolators are inserted onto the outer circumferential surface of the aluminum wheel along a tire width direction.

11. A non-pneumatic tire, comprising:
a cylindrical tread configured to come into contact with a road surface;
an aluminum wheel configured to form a circumference smaller than that of the tread and concentrically disposed inside the tread; and
a polyurethane spoke configured to perform a shock absorbing action while connecting the tread with the aluminum wheel,
wherein the aluminum wheel includes a plurality of depressed grooves formed at predetermined intervals along an outer circumferential surface of the aluminum wheel,
a plurality of vibration isolators made of vibration isolation material is inserted into the grooves, and
an overall surface area of the vibration isolators is 50% of a circumferential surface area of the aluminum wheel,
wherein the depressed grooves are depressed stepped grooves, and the polyurethane spoke directly comes into contact with the vibration isolators for reducing a sliding friction between the aluminum wheel and the polyurethane spoke and improving adhesion between the aluminum wheel and the polyurethane spoke.

12. The non-pneumatic tire of claim 11, wherein the vibration isolators are made of one or more selected from the group consisting of butyl rubber, natural rubber, styrene butadiene rubber, styrene butadiene rubber including a maleic acid or a maleic acid derivative, nitrile butadiene rubber, epichlorohydrin rubber, halobutyl rubber, chlorosulfonated polyethylene rubber, chlorinated polyethylene rubber, and brominated polyethylene rubber.

13. The non-pneumatic tire according to claim 11, wherein the vibration isolators are inserted onto the outer circumferential surface of the aluminum wheel along a tire width direction.

* * * * *